United States Patent [19]
Chiariotti

[11] Patent Number: 5,812,753
[45] Date of Patent: *Sep. 22, 1998

[54] METHOD FOR INITIALIZING OR RECONSTRUCTING DATA CONSISTENCY WITHIN AN ARRAY OF STORAGE ELEMENTS

[75] Inventor: Enzo Chiariotti, Eatontown, N.J.

[73] Assignee: ECCS, Inc., Tinton Falls, N.J.

[*] Notice: This patent issued on a continued prosecution application filed under 37 CFR 1.53(d), and is subject to the twenty year patent term provisions of 35 U.S.C. 154(a)(2).

[21] Appl. No.: 545,430

[22] Filed: Oct. 13, 1995

[51] Int. Cl.$^6$ ............................ G06F 13/00; H03M 13/00
[52] U.S. Cl. ................................ 395/182.04; 395/185.07; 371/37.7
[58] Field of Search .................... 395/182.04, 182.03, 395/441, 185.05, 185.07, 185.02, 185.01; 371/31, 48, 49.1, 37.7

[56] References Cited

U.S. PATENT DOCUMENTS

| | | | |
|---|---|---|---|
| 5,210,860 | 5/1993 | Pfeffer et al. ............................ | 395/575 |
| 5,249,279 | 9/1993 | Schmenk et al. ........................ | 395/425 |
| 5,313,626 | 5/1994 | Jones et al. .............................. | 395/575 |
| 5,367,669 | 11/1994 | Holland et al. .......................... | 395/575 |
| 5,418,921 | 5/1995 | Cortney et al. .......................... | 395/425 |
| 5,423,046 | 6/1995 | Nunnelley et al. ...................... | 395/750 |
| 5,502,836 | 3/1996 | Hale et al. ........................... | 395/497.01 |
| 5,511,227 | 4/1996 | Jones ....................................... | 395/829 |
| 5,519,844 | 5/1996 | Stallmo .................................... | 394/441 |
| 5,524,204 | 6/1996 | Verdoorn, Jr. ..................... | 395/182.04 |
| 5,533,190 | 7/1996 | Binford et al. ..................... | 395/182.04 |
| 5,537,534 | 7/1996 | Voigt et al. ........................ | 395/182.04 |
| 5,572,660 | 11/1996 | Jones .................................. | 395/182.04 |
| 5,581,690 | 12/1996 | Ellis et al. .......................... | 395/182.04 |

OTHER PUBLICATIONS

Lee, E. K., "Software and Performances Issues . . . ," University of California at Berkeley, Report No. UCB/CSD 90/573, May 1990, Computer Science Division (EECS), University of Cal. at Berkeley, pp. 1–32, May 17, 1990.

Chen et al., "Raid high performance, reliable secondary storage," ACM Computing Surveys, vol. 26, No. 2, pp. 146–181, Feb. 6, 1994.

Patterson et al., "Introduction to redundant arrays of inexpensive disk (RAID)," IEEE, Compcon Spr 1989.

Lee et al., "Performance of parity placement in disk arrays," IEEE transaction on computers, vol. 42, No. 6, pp. 651–661, Jun. 6, 1993.

Katz et al., "Disk susttem architectures for high performance computing," IEEE Proceeding, vol. 77, No. 12, pp. 1842–18–57, Dec. 12, 1989.

Schulze et al., "How reliable is a raid," IEEE Compcon Spr 1989, pp. 118–122.

*Primary Examiner*—Robert W. Beausoliel, Jr.
*Assistant Examiner*—Norman M. Wright
*Attorney, Agent, or Firm*—Thomason and Moser

[57] ABSTRACT

A method of initializing or reconstructing data redundancy within a array of storage elements. Specifically, the method is performed by the array management software, either as part of the array controller or a host computer performing array controller functions, such that, for a new array, the data therein is made consistent (e.g., XOR consistent using parity data) and, for an array with a recently replaced storage element, data is reconstructed within the new storage element. In either case, after executing the inventive routine, the array is fault tolerant and the data is consistent in accordance with the technique used to generate fault tolerance.

13 Claims, 3 Drawing Sheets

METHOD FOR INITIALIZING OR RECONSTRUCTING DATA CONSISTENCY WITHIN AN ARRAY OF STORAGE ELEMENTS

BACKGROUND OF THE DISCLOSURE

1. Field of the Invention

The invention relates to computer data storage devices and, more particularly, to a method for initializing (building) or reconstructing (rebuilding) data consistency within an array of storage elements.

2. Description of the Background Art

A data storage array is a collection of storage elements that are accessible by a host computer as a single storage unit. The individual storage elements can be any type, or a combination of types, of storage device such as, hard disk drives, semiconductor memory, floptical disk drives, and the like. The most common form of storage array is comprised of a plurality of hard disk drives, i.e., commonly referred to as a disk array.

More specifically, a disk array is a collection of disks from one or more commonly accessible disk subsystems combined with a body of array management software. Array management software controls the operation of the disks and presents them as one or more virtual disks to a host operating environment. The host operating environment is typically a host computer that executes an operating system and one or more application programs. A virtual disk is an abstract entity realized by the array management software. A virtual disk is functionally identical to a physical disk from the standpoint of application software executing on the host computer. The array is generally embodied in a disk subsystem which is a collection of individual disks and the hardware required to connect them to one or more host computers. The disk subsystem hardware may include a controller, or the disks may be connected directly to a host computer's input/output (I/O) adaptor. Consequently, the array management software is either executed by the host computer or by a microprocessor within the disk subsystem controller.

The array management software principally functions to map the storage space available to application software onto the array member disks in a way that achieves some desired balance of cost, availability, and performance. Furthermore, the array management software presents the storage elements to the operating environment as one or more virtual disks by transparently converting I/O requests to a virtual disk to I/O operations on the underlying member disks.

One such disk array, is a redundant array of independent disks, commonly known as RAID or a RAID array. The term RAID represents a family of techniques for managing collections of disks in such a way that desirable cost, availability, and performance properties are provided to host computing environments. RAID arrays come in various operating levels which range from RAID level 0 (RAID-0) to RAID level 6 (RAID-6). Additionally, there are multiple combinations of the various RAID levels that form hybrid RAID levels such as RAID-6+, RAID-5+, RAID-10, RAID-53 and so on. Each RAID level represents a different form of data management and data storage within the RAID disk drive array.

The present invention is best described as operating in conjunction with RAID level 5 (RAID-5) and, as such, the following description of the background art only discusses RAID-5 type disk arrays. The other types of arrays are discussed in detail in "The RAIDbook, A Source Book for Disk Array Technology" 4th ed., published by the RAID Advisory Board, Apr. 1, 1995.

In a RAID-5 array, data is generally mapped to the various physical disks in data "stripes" across the plurality of physical disks and vertically in a "strip" within a single physical disk. To facilitate data storage, a serial data stream is partitioned into blocks of data, the size of each block is generally defined by the host operating environment. Typically, one or more blocks are stored together to form a "chunk" or "segment" of data at an address within a given disk drive. Each chunk is stored on a different disk drive as the data is striped across the disk drives. Once all the drives in a stripe have been given chunks of data, the storage process returns to the first disk in the stripe, and stripes across all the disk drives again. As such, the input data stream is stored in a raster scan pattern onto all the drives in the array.

In a RAID-5 array, data consistency and redundancy is assured using parity data that is distributed amongst all the disk drives. Specifically, a RAID-5 array contains N member disks. Each stripe of data contains N-1 data strips and one parity strip. The array's parity segments are distributed across the array members usually in cyclic patterns. For example, in an array containing five disks, the first parity strip is located in member disk 4, the second on member disk 3, the third parity strip in member disk 2, and so on.

RAID-5 parity is generated using an exclusive OR (XOR) function. In general, parity data is generated by taking an XOR function of the user data strips within a given data stripe. Using the parity information, the contents of any strip of data on any single one of the data disks in the array can be regenerated from the contents of the corresponding strips on the remaining disks in the array. Consequently, if the XOR of the contents of all corresponding blocks in data stripe, except one is computed, the result is the contents of the remaining block. Thus, if disk 3 in the five disk array should fail, for example, the data it contains can still be delivered to applications by reading corresponding blocks from all the surviving members and computing the XOR of their contents. As such, the RAID-5 array is said to be fault tolerant, i.e., the loss of one disk drive in the array does not impact data availability.

Before a RAID-5 array may be utilized in the fault tolerant mode by the operating environment, the RAID-5 array must be initialized. During initialization, the data in the array is made XOR consistent such that fault tolerancy is available. It is advantageous to accomplish the initialization rapidly and while simultaneously allowing access to the array by the operating environment. Furthermore, to facilitate efficient use of computer code, it would be advantageous to utilize the same software code for array reconstruction as is used for initialization.

SUMMARY OF THE INVENTION

The present invention is a method of initializing or reconstructing data consistency within an array of storage elements. Specifically, the invention is a method performed by the array management software such that, for a new array, the data therein is made consistent (e.g., XOR consistent) and, for an array with a recently replaced storage element, the data is reconstructed within the new storage element. In either case, after executing the inventive method, the array is fault tolerant and the data is consistent.

More specifically, the invention is a method of generating data consistency throughout a plurality of storage elements that form a storage array. The array is partitioned into redundancy groups, with each redundancy group defining a number of data chunks that the method makes consistent. The method performs the following steps: (a) selecting a storage element from the plurality of storage elements; (b) selecting an address (i) within the selected storage element; (c) reading data from addresses, other than address (i) of the selected storage element, within a redundancy group of address (i) stored in the plurality of storage elements; (d) computing a consistency value using the data from the redundancy group; (e) writing the consistency value at the address (i) in the selected storage element; (f) increment address (i); and (g) repeating steps b, c, d, e, and f until all addresses (i) in the selected storage element have been written with a consistency value.

Illustratively, the invention is used in a RAID-5 array where the storage elements are hard disk drives, the redundancy group contains the chunks within a data stripe, and the consistency data is parity data formed by XOR of the chunks within the data stripe other than the chunk at address (i) in the selected disk drive.

The method can be executed as an initialization routine to build redundancy into an array containing inconsistent data and, as such, cause the array to be fault tolerant. Alternatively, the same method can be used to rebuild an array after a drive has been replaced. In the later case, the selected storage element is the newly replaced element. Furthermore, the method does not bar utilization of the array as the initialization or reconstruction process is executing. In other words, the array is fully functional, although not fully fault tolerant, while the inventive method is being executed.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
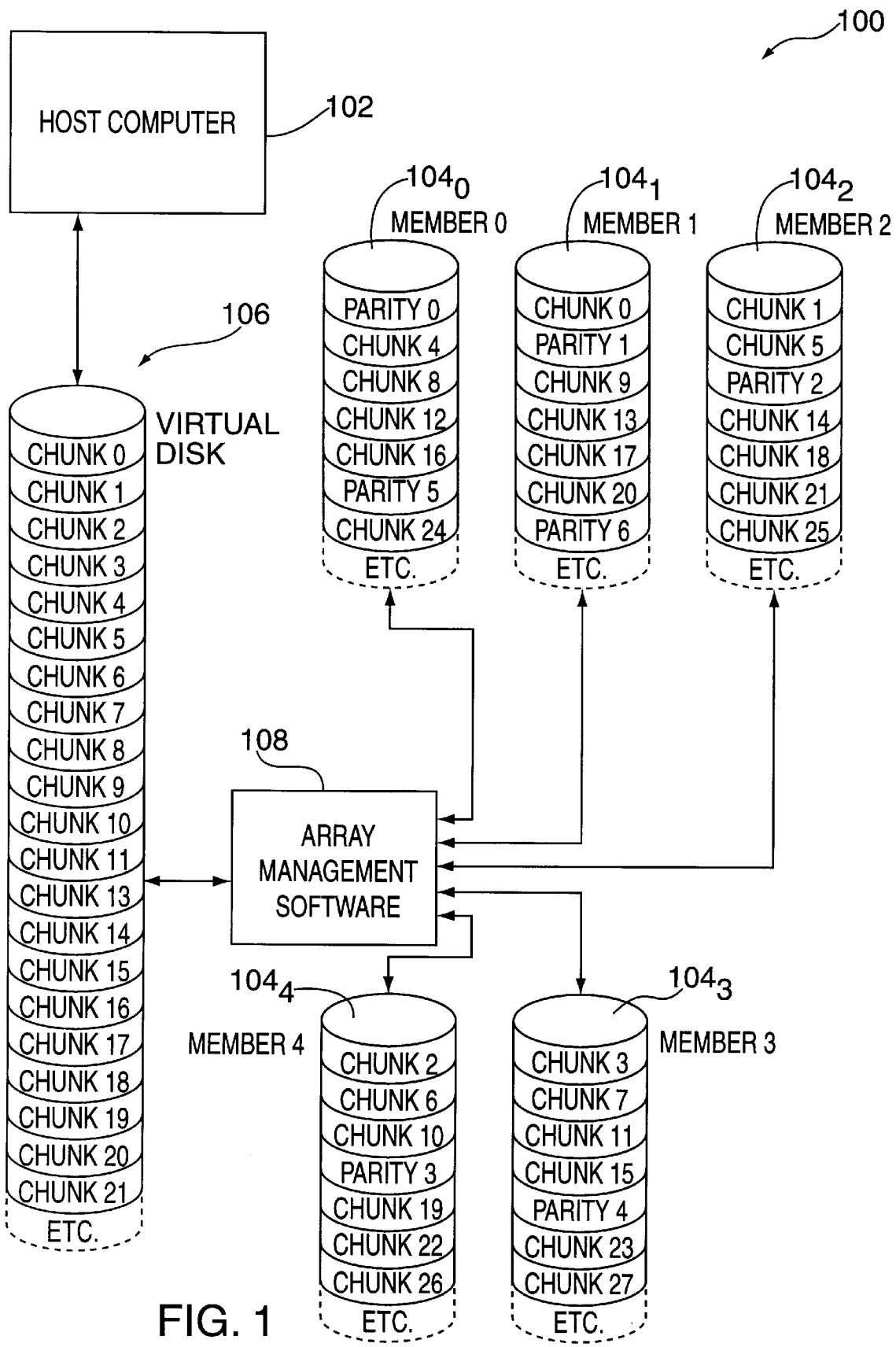
FIG. 1 depicts a block diagram of a storage element array system.

FIG. 1 depicts an information storage system 100 containing a host computer 102 and a plurality of individual storage elements $104_n$, where n is an integer value representing a storage element member number. The host computer executes, on one or more processors, an operating system as well as various applications that periodically read and write information from and to the storage elements. For simplicity the combination of the operating system and applications shall be referred to as the operating environment. The operating environment accesses various ones of the storage elements as if the individual storage elements functioned as a single, large storage element. An illustrative host computer system is a model A11 or a model A14 manufactured by Unisys Corporation of Blue Bell, Pa.

Typically, the storage elements are inexpensive hard disk drives arranged in an array. Various other forms of data storage devices may be substituted for, or combined with, the disk drives. Such other forms of storage elements include, but are not limited to, floptical drives, ZIP drives, floppy disk drives, semiconductor memory devices, or any other form of random access memory. Although any of these other forms of storage elements may be used with the invention, for simplicity, the following discussion refers mostly to hard disk drives as the storage elements.

When using disk drives, the operating environment treats the plurality of disk drives as a single disk drive commonly referred to as a virtual disk 106. The data is represented to the host computer as being stored in the virtual disk in serial fashion. Thus, the operating environment requests data from the virtual disk using a convenient single address. The array management software 108 ensures that the address into the virtual disk is mapped to an address within a physical disk within the plurality of physical storage elements. The array management software 108 can reside either within the host computer or within a disk array controller (not shown).

The physical disk drives, known as member disks or simply as members, are accessed via the array management software. The data is distributed, or striped, amongst the physical disks in an effort to evenly distribute access loading amongst all the members. To achieve fault tolerance, the data is arranged into redundancy groups where the data within a redundancy group is self consistent with the other data in the group. One technique for making the data redundant is to use parity data. As such, the redundancy group is a parity group in which the data in the group is XOR consistent.

Figure 2:
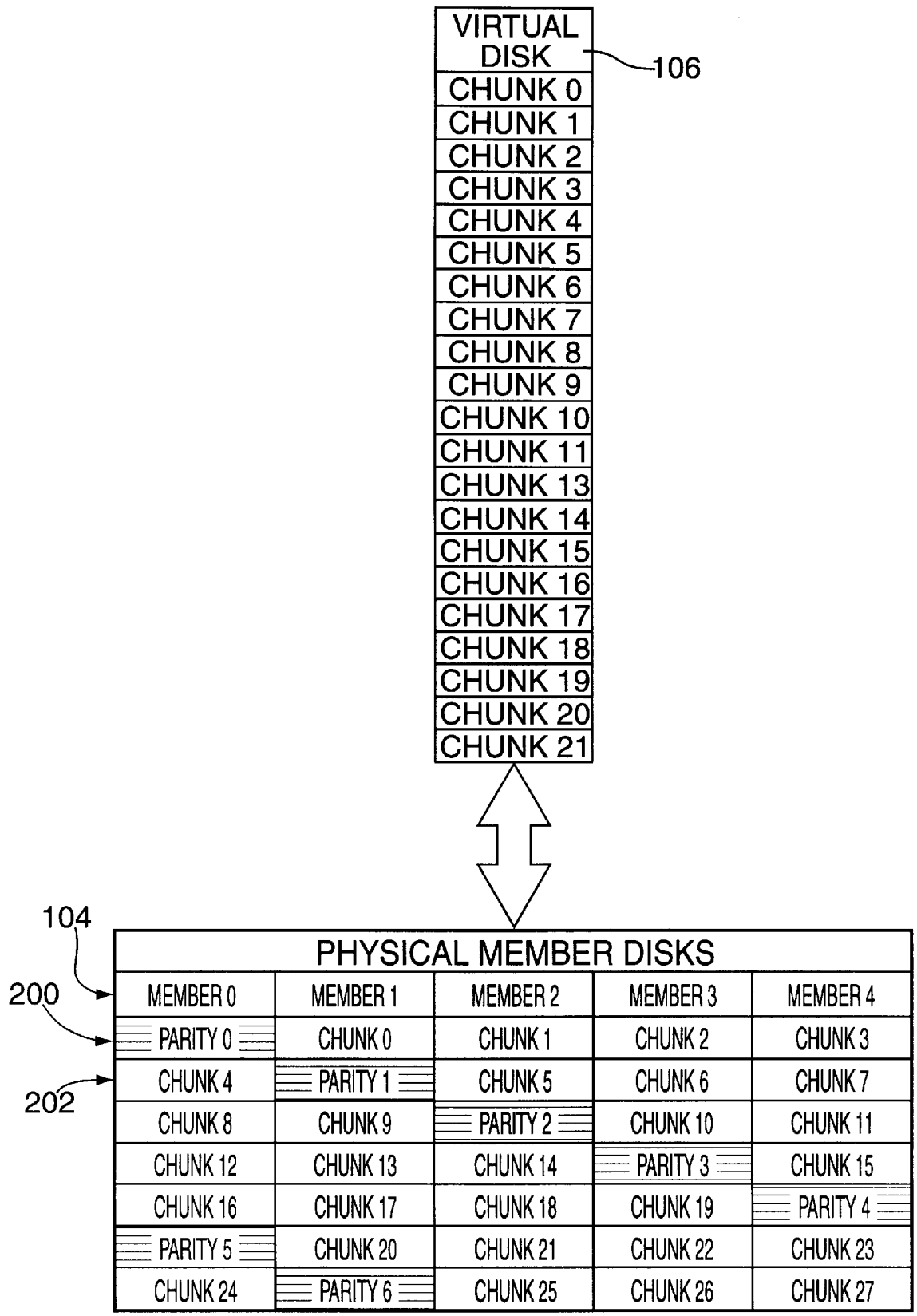
FIG. 2 depicts a conventional data striping format for a RAID-5 disk array system.

FIG. 2 depicts a conventional data striping format for a RAID-5 disk array. Under the RAID-5 standard, data appearing in the virtual disk 106 is striped across the physical disks (members 0–4) in a raster scan fashion. Interposed within the data (chunks 0, 1, 2, and so on) is parity data (parity 0, 1, 2, and so on). Since, the amount of data stored in each disk drive location is system or implementation specific, this data amount is simply referred to herein as a "chunk". The size of a "chunk" of parity data is the same as the size of the data chunks from which it is derived. Under RAID-5, the parity data is stored in a diagonal manner across the drives. However, the specific pattern of storage is not important as long as the parity data locations are mappable. Consequently, the array management software knows where the parity information is stored such that the parity groups can be easily identified.

Although utilization of parity information to form consistent data groups is well-known in the art, a short tutorial regarding the use of parity information in a RAID-5 disk array system will clarify operation of the invention. Parity data is generated by using an exclusive OR (XOR) function upon a series of data chunks typically located within a given data stripe 200. For example, in FIG. 2, the Parity 0 data is formed by applying the XOR function to Chunk 0 through Chunk 3 (e.g., Chunk 0 $\oplus$ Chunk 1 $\oplus$ Chunk 2 $\oplus$ Chunk 3=Parity 0). Similarly, in data stripe 202, Chunk 4 $\oplus$ Chunk 5 $\oplus$ Chunk 6 $\oplus$ Chunk 7=Parity 1 and so on. Thus, under RAID-5, each data stripe is XOR consistent. If one of the member disks ceased to function, the information contained in the remaining drives is used to reconstruct the data on the damaged drive. For example, if member disk 2 were damaged, Chunk 5 would be unreadable. However, Chunk 5=Chunk 4 $\oplus$ Parity 1 $\oplus$ Chunk 6 $\oplus$ Chunk 7. Thus, the array is fault tolerant, i.e., if one member disk is damaged the system is still operational without any loss of data.

During normal operation of the array, the array management software updates the parity information whenever new data is written to the member disks. The utilization of parity information to generate fault tolerance is well documented in such U.S. Pat. Nos. as 5,313,626 issued May 17, 1994, 5,367,669 issued Nov. 22, 1994, and 5,418,921 issued May 23, 1995. The disclosures within each of these patents is incorporated herein by reference.

For an array to become fully fault tolerant, each data stripe (parity group) must be XOR consistent. However, a newly assembled array is not XOR consistent and, therefore, is not fault tolerant. Upon start-up of a new array, the various member disk drives contain random data or possibly some standard data pattern generated during disk drive formatting. This data is commonly known as "garbage" data. In any case, the data stored on the members is not XOR consistent. To facilitate use of the array as a fault tolerant array, the information must be made redundant.

To achieve XOR consistency, the invention selects one member disk (typically, disk 0) for redundancy building. The consistency building process (known as a build process) assumes that whatever data is stored in each stripe (or parity group) must be XOR consistent with the data stored in the selected member disk. As such, the invention XOR's the data in each stripe and stores the result in the selected drive, replacing the current data in the selected drive. Thus, each stripe, one at a time, is made XOR consistent. As such, when this inventive array initialization process is complete, the data, although it is primarily "garbage" data, is XOR consistent throughout the array.

Furthermore, the build process is used, without modification, to accomplish data rebuilding upon drive replacement. For example, if a particular drive fails, the drive can be removed from the array and replaced with a functioning drive. Assuming the data was XOR consistent prior to the failure, the data that was stored in the failed drive can be reconstructed and restored to the replacement drive. This is accomplished using the build process, now called a rebuild process, to select the replaced drive, XOR the data in each stripe and store the result in the replacement drive. Once all the data stripes are processed in this manner, the drives are all consistent and are, once again, fault tolerant.

Figure 3:
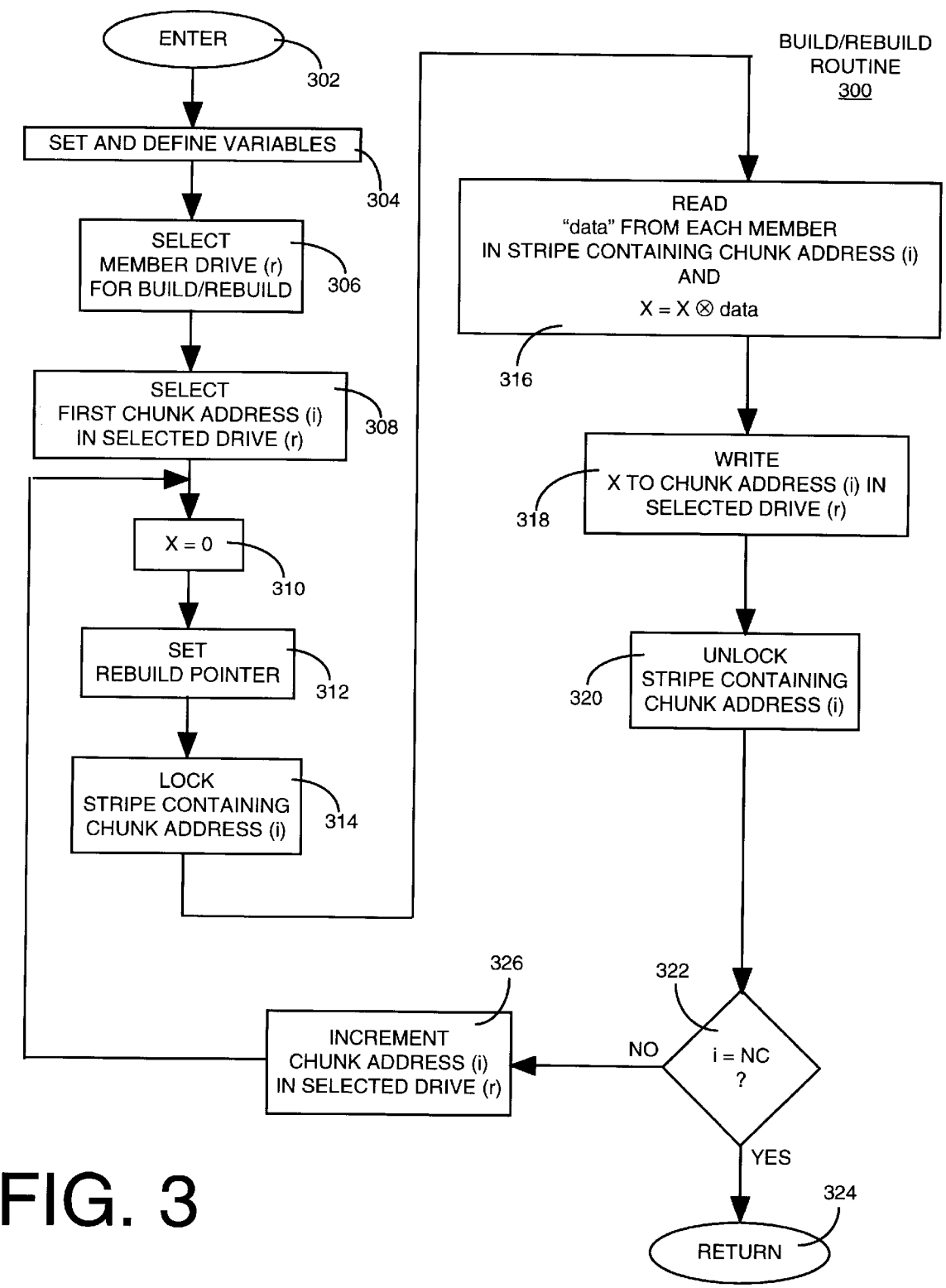
FIG. 3 depicts a flow chart representing the operation of the present invention.

Specifically, one illustrative implementation of the invention is as a subroutine executed by the array management software. This subroutine can be executed by the processor in the host computer or a processor in the disk subsystem controller. FIG. 3 depicts a flow chart of the operation of the inventive subroutine, the "build" routine (which is also a "rebuild" routine). Additionally, the subroutine can be represented as pseudocode. Both of these representations of the invention are discussed below.

The build/rebuild routine 300 is entered at step 302 and proceeds to step 304. At step 304, the routine initializes and defines a number of variables. Specifically, N is the total number of member drives in the array, r is the member drive that is to be built (or rebuilt), NC is the total number of chunks in each member drive, i denotes a specific chunk and r is a particular member drive in array of drives D. At step 306, the routine selects a particular drive (r) for building (or rebuilding). For the build process, drive (r) is arbitrarily selected. In the rebuild process, drive (r) is the identification of the recently replaced drive. Then, at step 308, the routine selects an address of a first chunk (i=0) within the selected drive (r). At step 310, the XOR variable (X) is set to zero.

Once all these variables have been set and defined, the routine proceeds to step 312. At step 312, the routine sets the build point to the stripe that is presently defined by the variable i. The build point indicator (or build pointer) is important in a situation where the array is being used as the build process progresses. In that situation, all stripes "above" the build point indicator, assuming the build process progresses from i=0 to i=NC (top to bottom), are operating in fault tolerant mode and all stripes below the build point indicator are operating in "reduced" mode, i.e., as if one member disk is inoperative. Above the build point indicator, the array is utilized (read and written) in a typical manner, while below the indicator the drive is accessed in reduced mode. The read and write functions are discussed in detail below. For now, suffice it to say that the build point indicator indicates a change of disk operating modes.

At step 314, the stripe containing the selected chunk is locked such that the array management software is not permitted to write to addresses within that stripe. The array management software must wait until the stripe is unlocked before access is permitted. This embodiment of the invention uses a simple locking method in that the array management software is merely barred from writing to the stripe. Those skilled in the art should realize that the locking process may be conditional such that the accesses might be permitted under certain circumstances. Other forms of locking are considered within the scope of the present invention.

At step 316, the routine reads data from the chunks encompassed by the locked stripe, i.e., from the redundancy group. As data from each chunk is retrieved, that data is XORed with the prior value of X, X=X $\oplus$ data. In this manner, all the data in the stripe is XORed with the other data in the stripe. The new X value is, at step 318, written to the chunk i in the presently selected drive and stripe. As such, all the chunks in that stripe are now XOR consistent.

At step 320, the stripe is unlocked. At step 322, the routine queries whether the last chunk in the selected drive has been processed, e.g., i=NC. If the query is affirmatively answered, the routine proceeds along the YES path to the return step 324. If the query is negatively answered, the routine proceeds along the NO path to step 326. At step 326, the chunk identification address is incremented, e.g., i=i+1 and the routine proceeds to step 310. Consequently, the build/rebuild routine 300 incrementally processes each stripe in the array to attain XOR consistency throughout the array. Once complete, the entire array is fully fault tolerant.

The foregoing flow chart of the build routine 300 has the following pseudocode representation:

---

```
N=NumberOfDrives (D);
r=ElementToBuild (D) ;/*any number between 0 and N-1*/
NC=NChunks (D);/*number of chunks of a drive in the array*/
for (i=0;i<NC;++i){
    X=0;
    SetBuildPoint (D,i);/*set build point of arrayD*/
    Lock(D,i);/*lock parity group i*/
    for (d=0;d<N;++d){
        *if (d==r) continue;/*skip the selected drive*/
        data=DiskRead(D[d],i);/*read i-chunk of drive d*/
        X=X⊕ data;
    }
    DiskWrite(D[r],i,X);/*write parity info to i-chunk of drive r*/
    Unlock(D,i);/*unlock parity group i*/
}
```

PSEUDOCODE 1
Build/Rebuild Routine 300

---

The DiskRead and DiskWrite routines that are executed by PSEUDOCODE 1 are conventional RAID-5 read and write access routines. For completeness the pseudocode for the read and write routines is presented below. PSEUDOCODE 2 represents the DiskRead routine.

```
RAID5Read(D,b);/*Read logical chunk b from array D*/
    Raid5ReadMapping (D,b,&d,&i);/*determine element and chunk in
    the array*/
    Lock(D,i);
    if (Status(D[d]) == DISK_OK){
        data=DiskRead(D[d],i);
    }else if (Status(D[d]) == DISK_REBUILD){
        if (i<GetRebuildPoint(D)){
            data=DiskRead(D[d],i);
        } else {
            data=ReducedModeRaid5Read(D,d,i);
        }
    } else {
        data= ReducedModeRaid5Read(D,d,i);
    }
    Unlock(D,i);
return data;
                    PSEUDOCODE 2
                    ReadDisk Routine
```

The foregoing read routine is provided a logical chunk address (b) within disk array (D). The routine maps the logical address to a physical address that specifies a particular disk (d) within the array and a specific chunk address (i) within that disk. Once the physical location of the chunk to be read is found through th mapping subroutine Raid5ReadMapping()). Next, the data stripe containing chunk address (i) is locked. Once locked, the status of the drive (d) is tested to ensure that it is operating, e.g., the status is DISK_OK. If the status is DISK_OK, the routine reads the data at chunk address (i) in disk (d) and then returns the data to PSEUDOCODE 1.

If the status of the disk (d) indicates that the drive is presently being rebuilt (or built), the status request will return a DISK_REBUILD indication from the status register. If the disk is being rebuilt or built by PSEUDOCODE 1, the disk can be accessed normally, e.g., fault tolerant mode access, for any address "above" the rebuild point. Any address "below" the rebuild pointer is accessible in the reduced mode. As such, PSEUDOCODE 2 retrieves the rebuild pointer location (GetRebuildPoint) and compares the pointer location to the location (i) of the desired chunk. If i is less than the pointer location, the read access is accomplished normally by simply retrieving the data at location (i) in disk (d). In contrast, if the chunk (i) is greater than the rebuild pointer, then the requested chunk is not available for direct retrieval. As such, the requested chunk is reconstructed by using the data stored in the other chunks in the stripe containing chunk (i). In other words, the other data is XORed to generate the unavailable chunk (i), e.g., execute ReducedModeRaid5Read()). Consequently, the data is available, but cannot be accessed directly.

Additionally, if the disk (d) has a status that indicates that it is not operational, e.g., the status register does not contain the DISK_OK or a DISK_REBUILD indicator, then the data is retrieved using the reduced mode read routine. Once the data is retrieved, whether directly or by reconstruction, the routine unlocks the previously locked data stripe. Lastly, the data is returned to PSEUDOCODE 1.

As for the write routine, PSEUDOCODE 3 represents the write routine.

```
RAID5Write(D,b,data);/*Write data to logical chunk b of array D*/
    Raid5WriteTranslation (D,b,&d,&p,&i);/*determine element,parity
    element and chunk in the array*/
    Lock(D,i);
    if (Status(D[d]) == DISK_OK){
        if (Status(D[p]) == DISK_OK){
            old=DiskRead(D[d], i);
            DiskWrite(D[d],i,data);
            X=data(x) old(x) DiskRead(D[p],i)
            DiskWrite(D[p],i,X);
        }else {
            DiskWrite(D[d],i,data);
        }
    } else {
        ReducedModeRaid5Write(D,d,i,data);
    }
    Unlock(D,i);
                    PSEUDOCODE 3
                    WriteDiskRoutine
```

In short, the foregoing write routine is provided a logical chunk address (b) within disk array (D). The routine maps (translates) the logical address to a physical address that specifies a particular disk (d) within the array and a specific chunk address (i) within that disk. Additionally, the disk (p) containing the parity data for the stripe containing chunk (i) is also identified because, when the new data is written to chunk (i), the parity data must also be updated to maintain XOR consistency. Once the physical location of the chunk (i) and its parity data (p) is found through the translation subroutine (e.g., Raid5WriteTranslation()), the data stripe containing chunk i is locked. Once locked, the status of both drive (d) and drive (p) are tested to ensure that they are operating in the fault tolerant mode, e.g., their status is DISK_OK. If the status is fault tolerant, the routine writes the data at chunk (i) in disk (d) and then updates the parity data and writes the new parity data to disk (p) in the stripe with chunk (i). The new parity X is computed by XORing the new data (data) with the old data (old) and with the old parity data (e.g., retrieved using DiskRead(D[p])).

If the status of disk (p) indicates that the drive is presently being rebuilt (or built) or is inoperative, the new data is simply written to the i address in drive (d) without changing the parity data.

Furthermore, if the status of disk (d) is anything other than DISK_OK, then the requested chunk is not available for direct writing. As such, the requested chunk is virtually written by altering the parity data in the stripe. Therefore, the chunk that should have been written is available for reading through reconstruction. In other words, the new data is XORed with the other data in the stripe to generate updated parity data (X) for storage at parity data location (p), e.g., execute ReducedModeRaid5Write()). Consequently, the data is available, but cannot be accessed directly.

Once the data is written, whether directly or virtually, the routine unlocks the previously locked data stripe.

The foregoing read and write routines should be considered illustrative of the type of routine that can be used in cooperation with the invention. Those skilled in the art will be able to draft routines having similar function, though not identical in form to those recited above.

The invention provides a method for building or rebuilding data redundancy within a storage element array. The method can be used for both initializing (building) a storage element array, as well as reconstructing (rebuilding) the array after a storage element is replaced. Thus, computer code is efficiently utilized. Additionally, utilization of the inventive method, whether during build or rebuild, does not preclude simultaneous use of the array. In other words, the array can be accessed while the build or rebuild process is accomplished in the background.

Although a single embodiment which incorporates the teachings of the present invention has been shown and described in detail herein, those skilled in the art can readily devise many other varied embodiments that still incorporate these teachings.

What is claimed is:

1. In a storage system containing a plurality of storage elements, a method of generating data consistency throughout the storage elements while simultaneously providing access to the storage elements as data consistency generation is being accomplished comprising the steps of:

(a) selecting a storage element from said plurality of storage elements;

(b) selecting address (i) within said selected storage element;

(c) locking address (i) of the storage elements within a redundancy group of address (i), where all addresses except address (i) within the storage elements of the redundancy group can be accessed while the redundancy group is being made consistent;

(d) reading data from addresses, other than address (i) within the selected storage element, within said redundancy group of address (i) stored in said plurality of storage elements;

(e) computing a consistency value using the data from said redundancy group;

(f) writing said consistency value to said address (i) in said selected storage element;

(g) unlocking said addresses (i) of the storage elements within the redundancy group of address (i);

(h) incrementing said address (i); and (i) repeating steps b, c, d, e, f, g and h until all addresses (i) in the selected storage element have been written with a consistency value.

2. The method of claim 1 wherein said consistency value is a parity value computed in step (e) by applying an exclusive OR function to all the data read from the addresses in the redundancy group.

3. The method of claim 1 wherein said redundancy group is a data stripe containing one address within each storage element in said plurality of storage elements.

4. The method of claim 1 wherein the method is performed to initialize said plurality of storage elements.

5. The method of claim 1 wherein the method is performed to reconstruct data for a storage element, where said selected storage element is a replaced storage element and said consistency value is reconstructed data.

6. The method of claim 1 wherein the storage system is a RAID level 5 array.

7. In a RAID level 5 storage system containing a plurality of hard disk drives forming an array, the array is partitioned into data stripes and data strips, a method of generating data consistency through the array comprising the steps of:

(a) selecting a hard disk drive from said plurality of hard disk drives;

(b) selecting address (i) within said selected hard disk drive;

(c) locking address (i) of hard disk drives within a redundancy group of address (i), where all addresses except address (i) within the hard disk drives of the redundancy group can be accessed while the redundancy group is being made consistent;

(d) reading data stored in said plurality of storage elements from addresses, other than address (i) within the selected disk drive, within a data stripe containing address (i);

(e) computing a parity value using the data from said data stripe;

(f) writing said parity value to said address (i) in said selected hard disk drive;

(g) unlocking said addresses (i) of the hard disk drives within the redundancy group of address (i);

(h) incrementing said address (i); and (i) repeating steps b, c, d, e, f, g and h until all addresses (i) in the selected hard disk drive have been written with a parity value.

8. The method of claim 7 wherein said parity value is computed in step (e) by applying an exclusive OR function to all the data read from the addresses in the data stripe.

9. The method of claim 7 wherein the method is performed to initialize said plurality of storage elements.

10. The method of claim 7 wherein the method is performed to reconstruct data for a hard disk drive, where said selected hard disk drive is a replaced hard disk drive and said parity value is reconstructed data.

11. The method of claim 7 wherein, prior to utilizing the method, the data stored in each of said hard disk drives is inconsistent, garbage data.

12. The method of claim 7 wherein a host computer accesses the array to read or write data while said method is executing.

13. The method of claim 12 wherein said data stripe containing address (i) is temporarily locked to prevent the host computer from writing data to addresses within the locked data stripe.

* * * * *

(12) EX PARTE REEXAMINATION CERTIFICATE (5031st)
United States Patent
Chiariotti

(10) Number: US 5,812,753 C1
(45) Certificate Issued: Nov. 30, 2004

(54) METHOD FOR INITIALIZING OR RECONSTRUCTING DATA CONSISTENCY WITHIN AN ARRAY OF STORAGE ELEMENTS

(75) Inventor: Enzo Chiariotti, Eatontown, NJ (US)

(73) Assignee: Veritas Operating Corporation, Mountain View, CA (US)

Reexamination Request:
No. 90/006,781, Sep. 23, 2003

Reexamination Certificate for:
| | |
|---|---|
| Patent No.: | 5,812,753 |
| Issued: | Sep. 22, 1998 |
| Appl. No.: | 08/545,430 |
| Filed: | Oct. 13, 1995 |

(51) Int. Cl.[7] .............................................. G06F 11/00
(52) U.S. Cl. ............................................. 714/6; 714/9
(58) Field of Search ............................. 714/5, 6, 7, 8, 714/702, 718, 763, 52, 54, 766, 770; 711/100, 113, 114

(56) References Cited

U.S. PATENT DOCUMENTS 5,537,534 A    7/1996  Voigt et al.

OTHER PUBLICATIONS

Holland, M., "On–Line Data Reconstruction in Redundant Disk Arrays," Carnegie Mellon University, May 1994.
Chen et al., "An Evaluation of Redundant Arrays of Disks Using an Amdahl 5890", *Proceedings of the 1990 ACM Sigmetrics Conference on Measurement and Modeling of Computer Systems*, May 1990., pp. 74–85.
Chen and Towsley, "The Design and Evaluation of RAID 5 and Parity Striping Disk Array Architectures", J. Parallel and Distributed Computing 17, 1993, pp. 58–74.
Ganger et al., "Disk Subsystem Load Balancing: Disk Striping vs. Conventional Data Placement", Proceedings of the Hawaii International Conference on System Sciences, Jan. 1993, pp. 40–49.

Gibson, "A Redundant Disk Arrays: Reliable, Parallel Secondary Storage (Secondary Storage)", Ph.D. Dissertation, University of California, UCB/CSD 91/613, 1991.
Holland and Gibson, "Parity Declustering for Continuous Operation in Redundant Disk Arrays", Proceedings of the 5th International Conference on Architectural Support for Programming Languages and Operating Systems, Oct. 1992, pp. 23–35.
Hou et al., "Balancing I/O Response Time and Disk Rebuild Time in a RAID5 Disk Array", Hawaii International Conference on System Sciences, Jan. 1993, pp. 70–79.
Hou and Patt, "Comparing Rebuild Algorithms for Mirrored and RAID5 Disk Arrays", ACM SIGMOD International Conference on Management of Data, May 1993, pp. 317–326.
Hou et al, "Issues and Problems in the I/O Subsystem Part I—The Magnetic Disk", Proceedings of 25th International Conference on System Sciences (Kauai, HI), vol. 1, pp. 48–57, Veljko Milutinovic and Bruce Shriver, editors, Jan. 7–10, 1992.
Menon et al., "Algorithms for Software and Low–Cost Hardware RAIDs", IEEE–COMPCON–95, IEEE Press, 1995, 411–418.

(List continued on next page.)

*Primary Examiner*—Dieu–Minh Le

(57) ABSTRACT

A method of initializing or reconstructing data redundancy within a array of storage elements. Specifically, the method is performed by the array management software, either as part of the array controller or a host computer performing array controller functions, such that, for a new array, the data therein is made consistent (e.g., XOR consistent using parity data) and, for an array with a recently replaced storage element, data is reconstructed within the new storage element. In either case, after executing the inventive routine, the array is fault tolerant and the data is consistent in accordance with the technique used to generate fault tolerance.

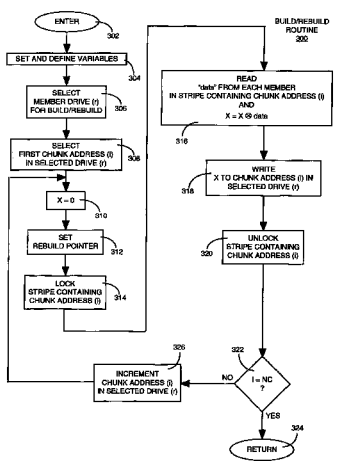

OTHER PUBLICATIONS

Menon and Cortney, "The Architecture of a Fault–Tolerant Cached RAID Controller", In Proc. of 20th ISCA, pp. 76–86, 1993.

Riegel and Menon, "Performance of Recovery Time Improvement Algorithms for Software RAIDs", Proceedings of the Fourth International Conference on Parallel and Distributed Information Systems, Dec. 18–20, 1996, Miami Beach, Florida, USA pp. 56–65.

Stodolsky, et al., "A Redundant Disk Array Architectures for Efficient Small Writes", Technical report CMUCS94–170, Carnegie Mellon Univ., Jul. 1994. http://citeseer.nj.nec.com/stodolsky94redundant.html.

Stonebraker and Schloss, "Distributed Raid—A New Multiple Copy Algorithm", Proceedings of the Sixth International Conference on Data Engineering, Feb. 5–9, 1990, Los Angeles, California, USA, pp. 430–437.

Tobagi et al., "Streaming RAID™—A Disk Array Management System for Video Files", In Proceedings of the First ACM Conference on Multimedia, Aug. 1993.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5 line 64–Column 6 line 12:

Once all these variables have been set and defined, the routine proceeds to step 312. At step 312, the routine sets the build point to the stripe that is presently defined by the variable i. The build point indicator (or build pointer) is important in a situation where the array is being used as the build process progresses. In that situation, all stripes "above" the build point indicator, assuming the build process progresses from i=0 to i=NC (top to bottom), are operating in fault tolerant mode and all stripes *at or* below the build point indicator are operating in "reduced" mode, i.e., as if one member disk is inoperative. Above the build point indicator, the array is utilized (read and written) in a typical manner, while *at or* below the indicator the drive is accessed in reduced mode. The read and write functions are discussed in detail below. For now, suffice it to say that the build point indicator indicates a change of disk operating modes.

Column 7 lines 32–51:

If the status of the disk (d) indicates that the drive is presently being rebuilt (or built), the status request will return a DISK_REBUILD indication from the status register. If the disk is being rebuilt or built by PSEUDOCODE 1, the disk can be accessed normally, e.g., fault tolerant mode access, for any address "above" the rebuild point. Any address *at or* "below" the rebuild pointer is accessible in the reduced mode. As such, PSEUDOCODE 2 retrieves the rebuild pointer location (GetRebuildPoint) and compares the pointer location to the location (i) of the desired chunk. If i is less than the pointer location, the read access is accomplished normally by simply retrieving the data at location (i) in disk (d). In contrast, if the chunk (i) is *at or* greater than the rebuild pointer, then the requested chunk is not available for direct retrieval. As such, the requested chunk is reconstructed by using the data stored in the other chunks in the stripe containing chunk (i). In other words, the other data is XORed to generate the unavailable chunk (i), e.g., execute ReducedModeRaid5Read ()), Consequently, the data is available, but cannot be accessed directly.

AS A RESULT OF REEXAMINATION, IT HAS BEEN DETERMINED THAT:

Claims 1 and 7 are determined to be patentable as amended.

Claims 2–6 and 8–13, dependent on an amended claim, are determined to be patentable.

1. In a storage system containing a plurality of storage elements, a method of generating data consistency throughout the storage elements while simultaneously providing access to the storage elements as data consistency generation is being accomplished comprising the steps of:

(a) selecting a storage element from said plurality of storage elements;

(b) selecting address (i) *as a build point* within said selected storage element;

(c) locking address (i) of the storage elements within a redundancy group of address (i), where all addresses except address (i) within the storage elements of the redundancy group can be accessed while the redundancy group is being made consistent, *all addresses previously identified as the build point are accessible in a fault tolerant mode, and addresses at the build point and addresses not previously identified as the build point are accessible in a reduced mode*;

(d) reading data from addresses, other than address (i) within the selected storage element, within said redundancy group of address (i) stored in said plurality of storage elements;

(e) computing a consistency value using the data from said redundancy group;

(f) writing said consistency value to said address (i) in said selected storage element;

(g) unlocking said address (i) of the storage elements within the redundancy group of address (i);

(h) incrementing said address (i) *to a next sequential address*; and (i) repeating steps b, c, d, e, f, g and h until all addresses (i) in the selected storage element have been written with a consistency value.

7. In a RAID level 5 storage system containing a plurality of hard disk drives forming an array, the array is partitioned into data stripes and data strips, a method of generating data consistency through the array comprising the steps of:

(a) selecting a hard disk drive from said plurality of hard disk drives;

(b) selecting address (i) *as a build point* within said selected hard disk drive;

(c) locking address (i) of hard disk drives within a redundancy group of address (i), where all addresses except address (i) within the hard disk drives of the redundancy group can be accessed while the redundancy group is being made consistent, *all addresses previously identified as the build point are accessible in a fault tolerant mode, and addresses at the build point and addresses not previously identified as the build point are accessible in a reduced mode*;

(d) reading data stored in said plurality of storage elements from addresses, other than address (i) within the selected disk drive, within a data stripe containing address (i);

(e) computing a parity value using the data from said data stripe;

(f) writing said parity value to said address (i) in said selected hard disk drive;

(g) unlocking said addresses (i) of the hard disk drives within the redundancy group of address (i);

(h) incrementing said address (i) *to a next sequential address*; and (i) repeating steps b, c, d, e, f, g and h until all addresses (i) in the selected hard disk drive have been written with a parity value.

* * * * *